(12) United States Patent
Jeong

(10) Patent No.: US 10,316,811 B2
(45) Date of Patent: Jun. 11, 2019

(54) METHOD FOR GUARANTEEING DRIVING PERFORMANCE OF ENGINE AND HYBRID ELECTRIC VEHICLE THEREOF

(71) Applicants: Hyundai Motor Company, Seoul (KR); Kia Motors Corporation, Seoul (KR)

(72) Inventor: Seok-Min Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 210 days.

(21) Appl. No.: 15/347,145

(22) Filed: Nov. 9, 2016

(65) Prior Publication Data

US 2018/0066622 A1 Mar. 8, 2018

(30) Foreign Application Priority Data

Sep. 8, 2016 (KR) .......................... 10-2016-0115484

(51) Int. Cl.
*F02N 11/10* (2006.01)
*F02N 11/08* (2006.01)
(Continued)

(52) U.S. Cl.
CPC .............. *F02N 11/108* (2013.01); *B60K 6/48* (2013.01); *B60W 10/02* (2013.01); *B60W 10/06* (2013.01); *B60W 10/08* (2013.01); *B60W 20/50* (2013.01); *B60W 50/0098* (2013.01); *F02N 11/0803* (2013.01); *F02N 11/0862* (2013.01); *B60K 2006/4825* (2013.01);
(Continued)

(58) Field of Classification Search
CPC ... B60K 6/48; F02N 11/0803; F02N 11/0862; F02N 11/108; F02N 2200/023; F02N 2200/025; F02N 2200/0806; F02N 2200/101

See application file for complete search history.

(56) References Cited

U.S. PATENT DOCUMENTS

2002/0043410 A1* 4/2002 Suzuki .................. B60K 6/365
180/65.25
2002/0171397 A1* 11/2002 Adrian ................ H01M 6/5033
320/119
(Continued)

FOREIGN PATENT DOCUMENTS

| JP | 2001-115869 A | 4/2001 |
|---|---|---|
| JP | 2001-165019 A | 6/2001 |
| JP | 5561435 B2 | 7/2014 |
| JP | 2015-182576 A | 10/2015 |

(Continued)

*Primary Examiner* — Khoi H Tran
*Assistant Examiner* — Robert T Nguyen
(74) *Attorney, Agent, or Firm* — Mintz Levin Cohn Ferris Glovsky and Popeo, P.C.; Peter F. Corless

(57) ABSTRACT

A method for guaranteeing starting performance of an engine for maintaining driving performance is provided. The method includes executing a quasi-failure mode in which the engine is changed to a driving state when an engine cranking apparatus state is maintained equal to or less than a threshold for a predetermined period of time. As a result, the engine is driven in the quasi-failure mode while the hybrid vehicle is driven in the EV mode to prevent the vehicle system from being aggravated and fundamentally preventing the degradation in the stability of the vehicle causing driver discomfort.

11 Claims, 5 Drawing Sheets

(51) Int. Cl.
   *B60K 6/48*    (2007.10)
   *B60W 50/00*   (2006.01)
   *B60W 10/02*   (2006.01)
   *B60W 10/06*   (2006.01)
   *B60W 10/08*   (2006.01)
   *B60W 20/50*   (2016.01)
   *F02N 11/04*   (2006.01)

(52) U.S. Cl.
   CPC ...... *B60W 2050/0096* (2013.01); *F02N 11/04* (2013.01); *F02N 2200/023* (2013.01); *F02N 2200/026* (2013.01); *F02N 2200/042* (2013.01); *F02N 2200/063* (2013.01); *F02N 2200/0806* (2013.01); *F02N 2200/101* (2013.01); *F02N 2300/2011* (2013.01); *Y02T 10/6221* (2013.01); *Y02T 10/6252* (2013.01); *Y02T 10/6286* (2013.01)

(56) References Cited

U.S. PATENT DOCUMENTS

| | | | |
|---|---|---|---|
| 2005/0162106 A1* | 7/2005 | Cho | B60K 6/46 318/139 |
| 2008/0296908 A1* | 12/2008 | Utsumi | F02D 29/02 290/40 C |
| 2012/0105006 A1* | 5/2012 | Hara | H01M 4/5825 320/128 |
| 2013/0073136 A1* | 3/2013 | Yamamoto | B60K 6/445 701/22 |
| 2016/0052511 A1* | 2/2016 | Takeuchi | F02N 5/04 701/22 |

FOREIGN PATENT DOCUMENTS

| | | |
|---|---|---|
| KR | 10-1995-014628 B1 | 12/1995 |
| KR | 2013-0029879 A | 3/2013 |
| KR | 2015-0078365 A | 7/2015 |
| KR | 2016-0008224 A | 1/2016 |

* cited by examiner

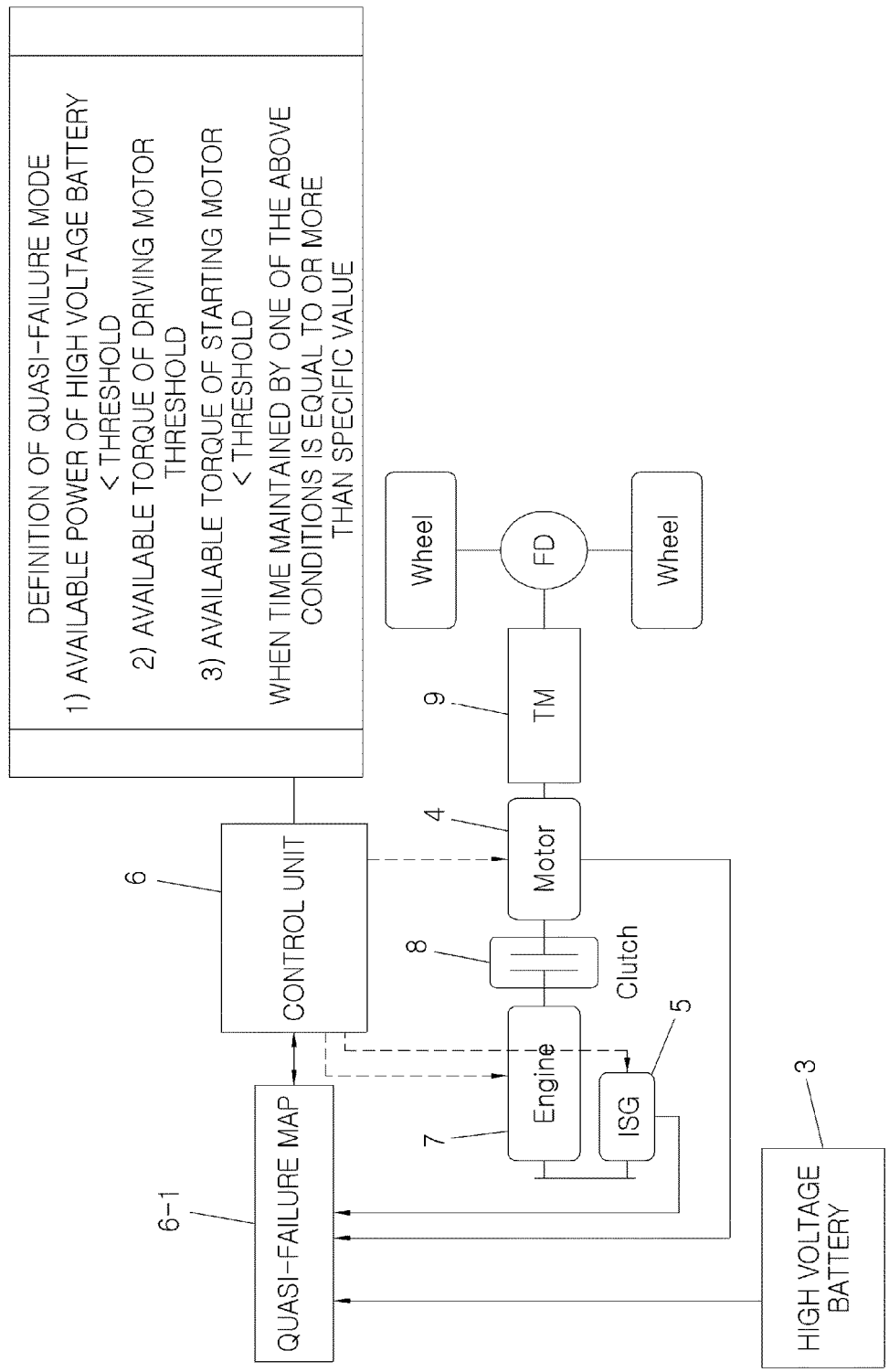

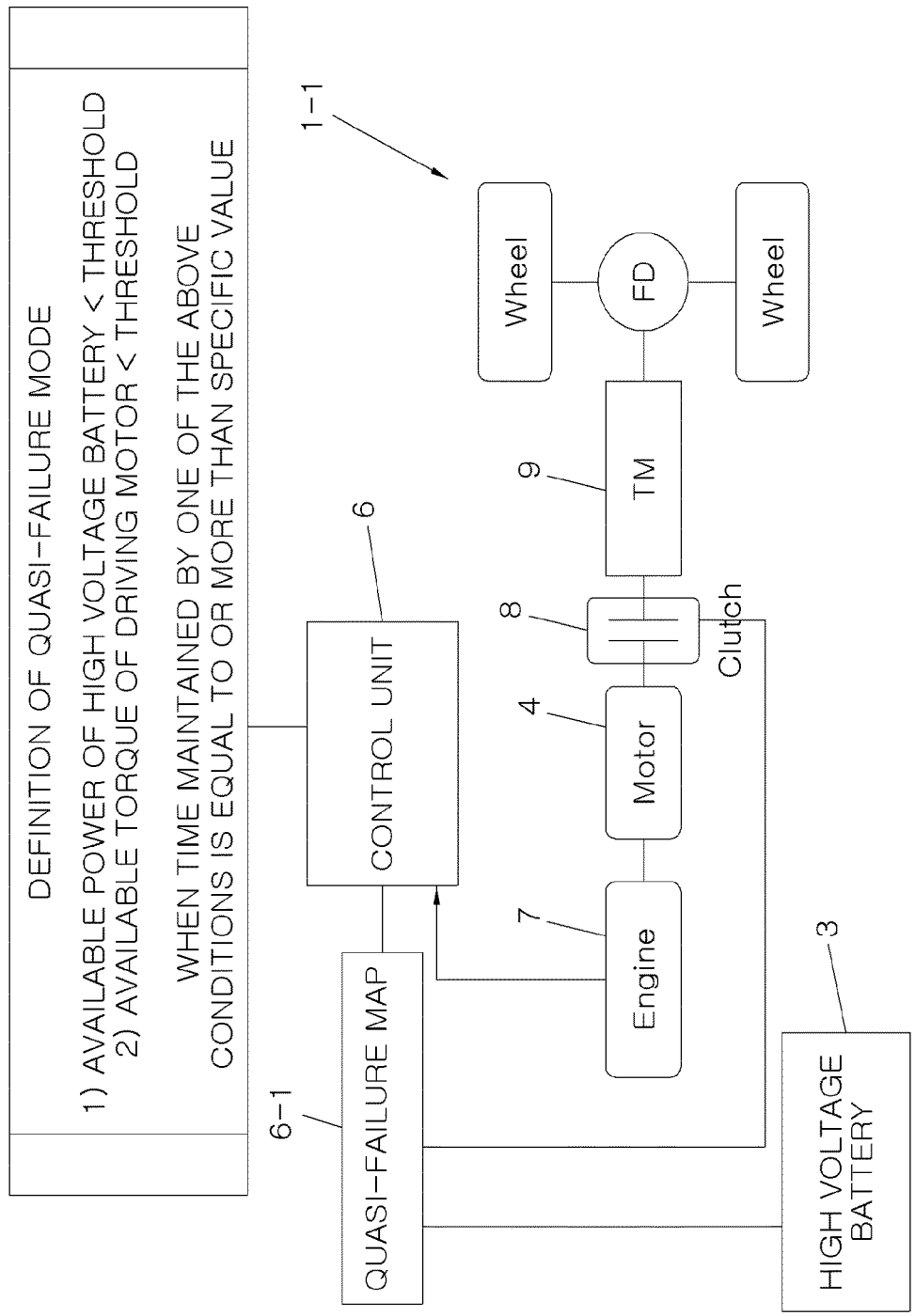

METHOD FOR GUARANTEEING DRIVING PERFORMANCE OF ENGINE AND HYBRID ELECTRIC VEHICLE THEREOF

CROSS-REFERENCE(S) TO RELATED APPLICATIONS

This application claims priority to Korean Patent Application No. 10-2016-0115484, filed on Sep. 8, 2016, which is incorporated herein by reference in its entirety.

BACKGROUND

Field of the Invention

The present invention relates to a hybrid vehicle, and more particularly, to a method for guaranteeing starting performance of an engine of the hybrid vehicle to prevent a vehicle system from being aggravated by maintaining driving performance.

Description of Related Art

Generally, a hybrid vehicle (or hybrid electric vehicle (REV)) includes an engine and a motor to implement a hybrid electronic vehicle (HEV) mode (e.g., simultaneously driving an engine and a motor) and an electronic vehicle (EV) mode (e.g., motor driving). In particular, in the REV, a driver starting request and a system starting request may be received to control engine driving. The driver starting request includes receiving an accelerator position from an accelerator position sensor (APS) based on an accelerator pedal operation as a starting condition to drive the engine according to the driver request. The system starting request includes receiving a request from a vehicle control unit (VCU) such as an engine controller and a motor control unit (MCU) as the starting condition to systematically drive an engine.

In particular, the system starting request may stably maintain a system when vehicle environment is an air conditioner operation, engine warm-up, and catalyst heating. In addition, the system starting request may implement a limp home mode (e.g., minimum driving mode of a vehicle in a failure state) by a fail-safe strategy of the vehicle during an abnormal vehicle state in which a vehicle controller detects a failure of an input signal or an inappropriate state of the input signal. Therefore, the HEV may prevent the vehicle system from being aggravated to some degree even when a general failure of the vehicle system is not detected or a fault detection function is insufficient.

However, the system starting request is implemented by a scheme that does not include an engine cranking apparatus state (e.g., motor (starting/driving motor), high voltage battery, integrated starter generator (ISG) or hybrid starter & generator (HSG) (small motor acting as a generator for starting an engine and charging a battery)) to crank (e.g., rotate a crank shaft by a force applied from the outside) the engine under the start condition. Therefore, the system starting request may not drive the engine under the failure of the engine cranking apparatus in which the vehicle system is expected to fail even when the vehicle system does not fail.

As a result, in the case of the HEV, the engine is not driven when necessary to bring about the aggravation of the vehicle system, performance degradation is maintained due to the aggravation of the vehicle system for a specific time and thus, a vehicle may not be driven when driven in the EV mode, and the driving performance of the vehicle is not yet guaranteed, and therefore stability of the vehicle may be degraded (e.g., the vehicle may suddenly shutdown, a power electronics (PE) system may not be used) and a driver may feel discomfort.

SUMMARY

An exemplary embodiment of the present invention provides a method for guaranteeing starting performance of an engine for maintaining driving performance and a hybrid vehicle capable of preventing a vehicle system from being aggravated under vehicle environment and even in failure of an engine cranking apparatus in addition to an abnormal vehicle state by subdividing a control to maintain starting performance of the engine into a driver starting request, a system starting request, and a quasi-failure mode starting request, in particular, fundamentally preventing stability of the vehicle from being aggravated.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method for guaranteeing starting performance of an engine for maintaining driving performance may include: monitoring the engine cranking apparatus when the vehicle is being driven by an operation of a driving motor; determining whether the engine cranking apparatus is maintained at a predetermined threshold or less and whether the engine cranking apparatus is maintained at the threshold or less for a predetermined period of time; driving, by the engine cranking apparatus, the engine when the engine cranking apparatus is determined to be maintained at the threshold or less for the predetermined period of time; and determining that the driving of the engine stops by continuously monitoring the engine cranking apparatus.

The engine cranking apparatus may include a battery, a driving motor, and a starting motor. In particular, each of the battery, the driving motor, and the starting motor may be monitored to determine whether each of an available power of the battery, an available torque of the driving motor, and an available torque of the starting motor is equal to or less than the threshold value. Accordingly, the components may be monitored to determine the continuation of the predetermined period of time in any one of each of the states of the threshold value or less (e.g., whether the components are maintained at the threshold value or less for the predetermined period of time). When the driving motor is maintained at the threshold value or less for the predetermined period of time, the engine may be driven by the starting motor. When the starting motor is maintained at the threshold value or less for the predetermined period of, the engine may be driven by the driving motor.

The method may further include a system mode to drive the engine in response to a driver request and by a system request detected by a vehicle controller, the driver mode may be the driver request detected by an accelerator position scope (AFS) based on an accelerator pedal operation, and the system mode may be the system request detected by any one of an air conditioner operation, engine warm-up, and catalyst heating and the system request understood as an abnormal vehicle state in which the vehicle controller detects a failure or an inappropriate state of an input signal.

The engine cranking apparatus may include the battery and the driving motor, and a starting motor. Additionally, each of the battery and the driving motor may be monitored to determine whether the available power of the battery is equal to or less than the threshold value and whether the available torque of the driving motor is equal to or less than the threshold value for the predetermined period of time and allow the driving motor to drive the engine when the condition is satisfied.

In accordance with another exemplary embodiment of the present invention, a hybrid vehicle may include: a power source that includes an engine and a driving motor connected to and separated from the engine by a clutch and connected to a transmission; an engine cranking apparatus including the driving motor, a battery configured to charge ad discharge, and a starting motor configured to start the engine and charge the battery; and a controller configured to allow the driving motor or the starting motor to drive the engine by monitoring the driving motor, the battery, and the starting motor to determine whether a state of each component is equal to or less than a threshold value for a predetermined period of time.

In accordance with still another exemplary embodiment of the present invention, a hybrid vehicle may include: a power source that includes a driving motor connected to an engine and connected to or separated from a transmission by a clutch; an engine cranking apparatus that includes the driving motor and a battery configured to charge and discharge; and a controller configured to allow the driving motor to drive the engine when one of the component states is equal to or less than the threshold for a predetermined period of time by the monitoring of the battery.

BRIEF DESCRIPTION OF THE DRAWINGS

The drawings are provided for reference in describing an exemplary embodiment of the present invention, so it should not be construed that the technical spirit of the present invention is limited to the accompanying drawings.

FIG. 4 is a diagram illustrating a control state of a quasi-failure mode of the hybrid vehicle for the method for guaranteeing starting performance of an engine according to the exemplary embodiment of the present invention; and FIG. 5 is a diagram illustrating a changed example of the hybrid vehicle to which the method for guaranteeing starting performance of an engine according to the exemplary embodiment of the present invention is applied.

DETAILED DESCRIPTION

Figure 1:
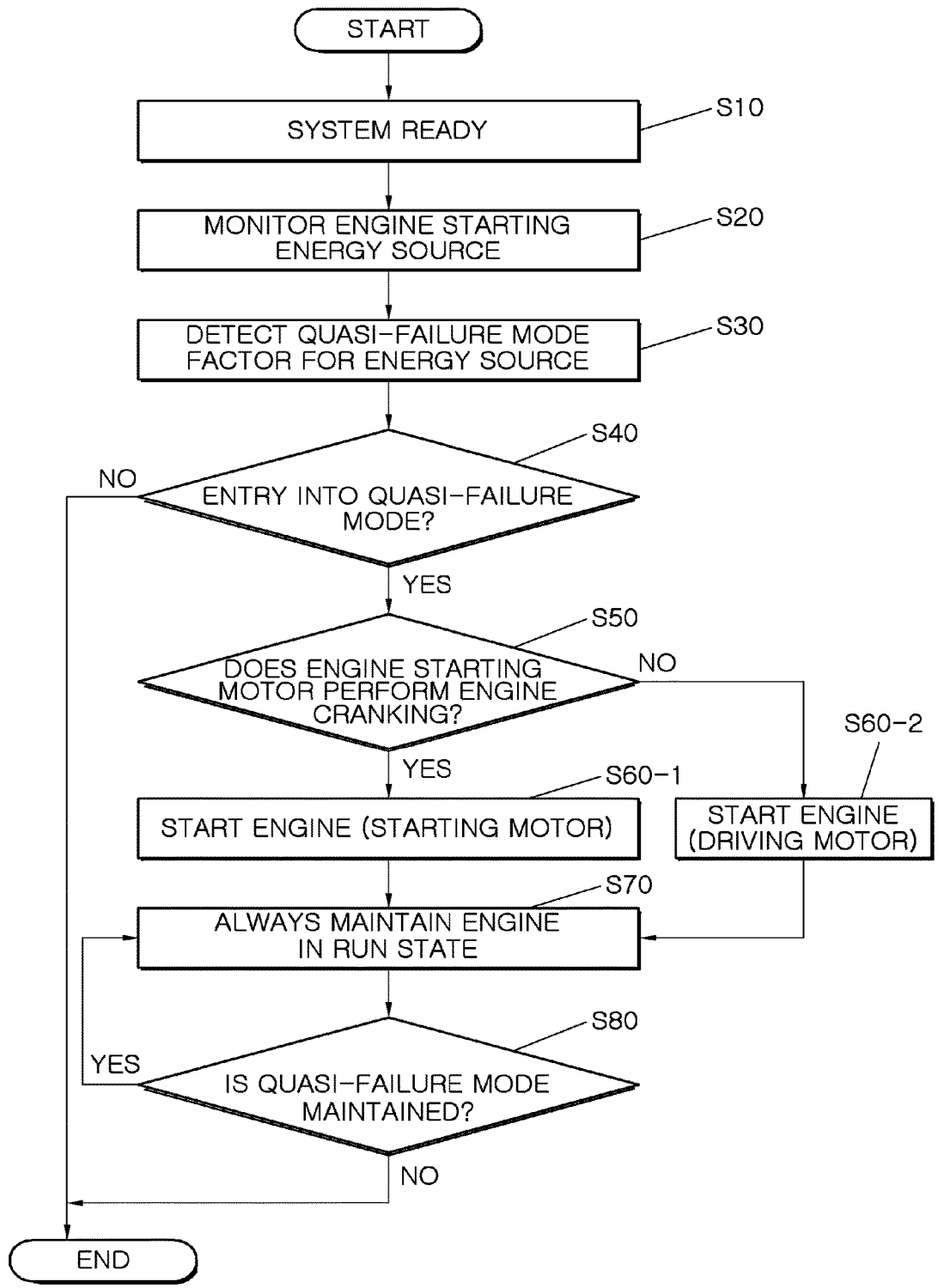
FIG. 1 is a flow chart of a method for guaranteeing starting performance of an engine for maintaining driving performance according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings and these exemplary embodiments may be implemented in various forms by a person having ordinary skill in the art to which the present invention pertains and therefore the present invention is not limited to the embodiments described herein.

Referring to FIG. 1, a method for guaranteeing starting performance of an engine for maintaining driving performance may drive an engine by quasi-failure modes S40 to S80 of a starting request using engine cranking in addition to driving the engine by a driver mode in which a driving starting request and a system mode of a system starting request are received. Accordingly, a fail-safe strategy may be extended to cope with failures of an engine cranking apparatus in which the vehicle system is expected to fail even when the vehicle system does not fail. Further, the vehicle system may maintain the performance without degrading driving performance of a vehicle even when a hybrid controller may not detect a failure of a general system or may have an insufficient fault detection function. As a result, the driving of the vehicle may be controlled to prevent driver feel discomfort such as when the vehicle is suddenly shutdown or a power electronics system may not be used.

Figure 2:
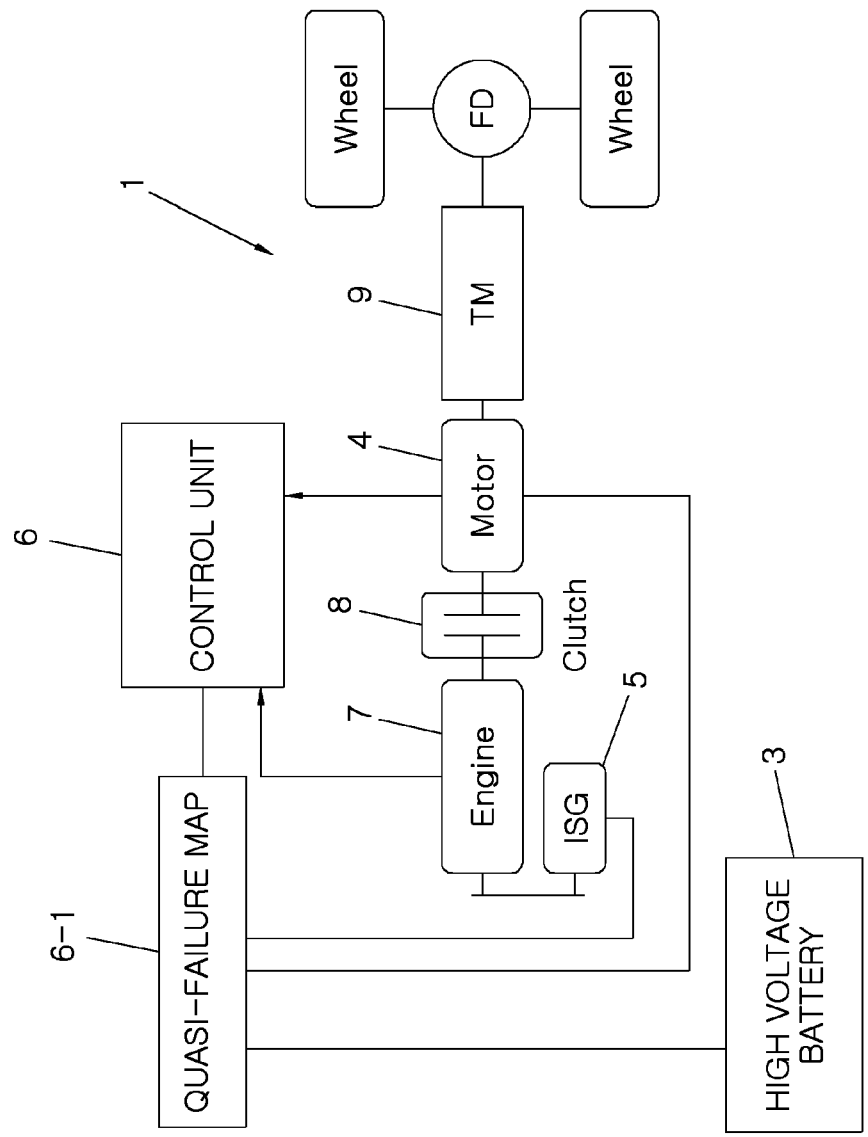
FIG. 2 is a diagram illustrating an example of a hybrid vehicle to which the method for guaranteeing starting performance of an engine according to the exemplary embodiment of the present invention is applied.

Referring to FIG. 2, a hybrid vehicle is a transmission mounted electric device (TMED) type hybrid vehicle 1 in which a motor is connected to an engine by a clutch while being mounted in a transmission, in which the TMED hybrid vehicle 1 implements an engine driving control of three types such as a driver mode, a system mode, and a quasi-failure mode.

In particular, the TMED hybrid vehicle 1 may include a high voltage type battery 3, a driving motor 4 configured to generate driving power, an integrated starter generator (ISG) type starting motor 5 configured to start an engine 7 and charge a battery 3, a controller 6 connected with a quasi-failure map 6-1, an internal combustion engine type engine 7, a clutch that connects and separates between the driving motor 4 and the engine 7, and a transmission 9 in which a shift stage is implemented. In particular, the controller 6 may be any one of a dedicated controller or a motor control unit for a quasi-failure mode, an engine electronic control unit (ECU), a battery management system, and a hybrid control unit.

In particular, the quasi-failure mode by the controller 6 and the quasi-failure map 6-1 may be implemented using the battery 3, the driving motor 4, and the starting motor 5 as the engine cranking apparatus, determining a quasi-failure state (e.g., state in which a failure occurs without performance degradation) in which the engine cranking apparatus is maintained at a particular threshold for a predetermined period of time by monitoring the engine cranking apparatus while the vehicle is driven in an EV mode, and then driving the engine 7 using the engine cranking apparatus.

Figure 3:
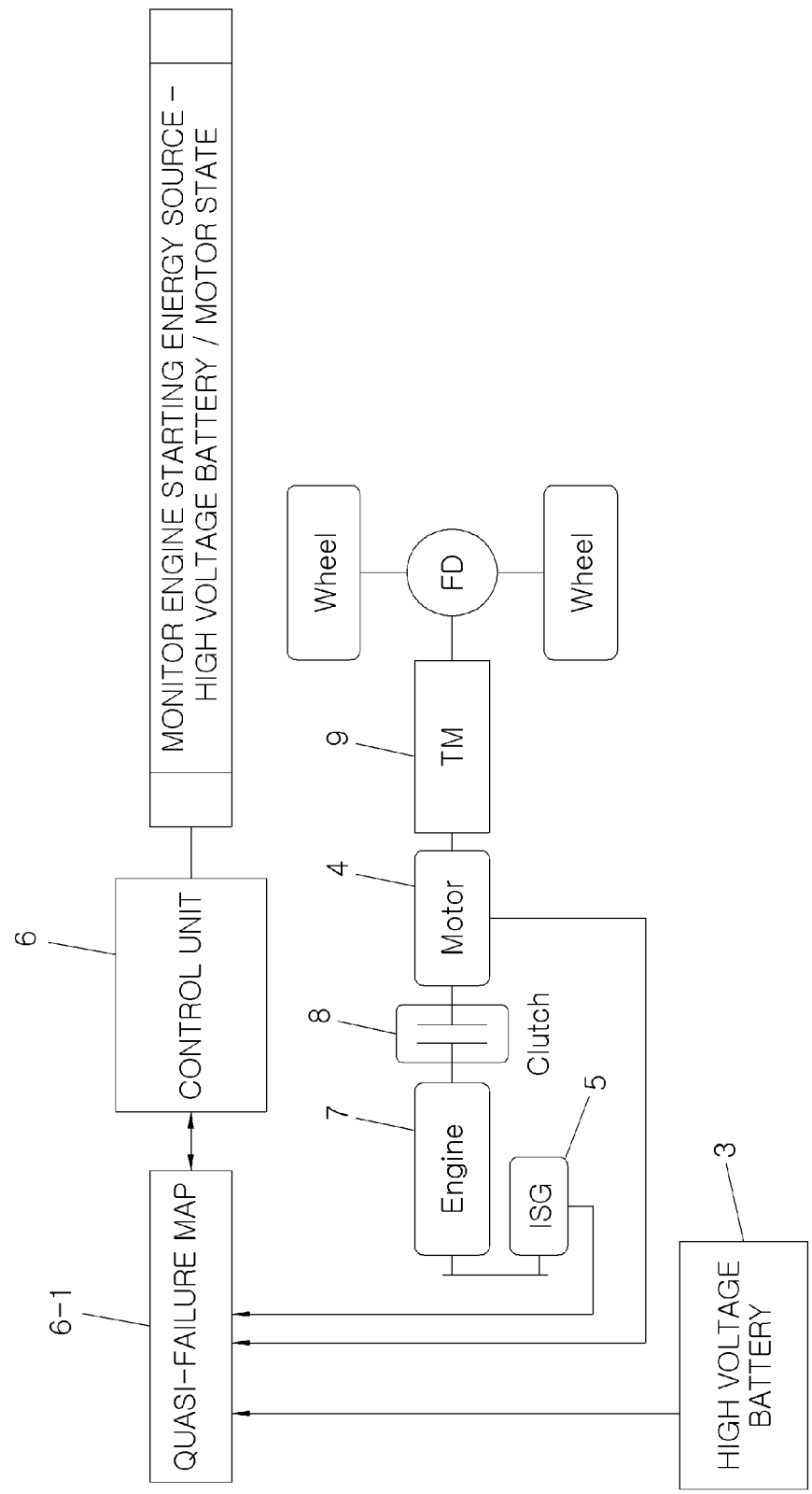
FIG. 3 is a diagram illustrating a monitoring state of the hybrid vehicle for the method for guaranteeing starting performance of an engine according to the exemplary embodiment of the present invention.

Hereinafter, the method for guaranteeing starting performance of an engine for maintaining driving performance of FIG. 1 will be described in detail with reference to FIGS. 2 to 4. In particular, a control subject may be any one of an engine EUC, a MCU, a BSM, and an HCU, but the controller 6 connected with the quasi-failure map 6-1 will be mainly described and as an object to be operated, the driving motor 4 or the starting motor 5 driving the engine 7 will be described.

In S10, an operating state of a system may be detected by the controller 6. Referring to FIG. 2, the system is the driving motor 4. The controller 6 implements the quasi-failure mode while the vehicle is driven in the EV mode. Therefore, 'system READY' is a state in which the controller 6 confirms the driving of the EV mode driving of the TMED hybrid vehicle 1 as the driving of the driving motor 4.

In S20, an engine starting energy source may be monitored by the controller 6. Referring to FIG. 3, the engine starting energy source is the battery 3, the driving motor 4, and the starting motor 5 that are operated as the engine cranking apparatus. Therefore, a state of charge of the battery 3, a driving state of the driving motor 4, a driving ready state of the starting motor 5, or the like may be detected in the quasi-failure map 6-1 by the corresponding sensor and the controller 6 may be configured to detect the state of each of the battery 3, the driving motor 4, and the starting motor 5 based on the quasi-failure map 6-1.

In S30, an operation failure or malfunction state of the engine starting energy source for determining the quasi-failure mode may be determined by the controller 6. Referring to FIG. 4, the controller 6 may be configured to apply a predetermined threshold to each of the available power as the SOC of the battery 3, the available torque of the driving motor, the available torque of the starting motor 5 and determine the operation failure state of the engine starting energy source based on the following relation Equation.

Lack of battery charging=Available power of battery<threshold of battery

Lack of driving motor output=Available torque of driving motor<threshold of driving motor Failure of starting motor=Available torque of starting motor<threshold of starting motor wherein, "<" is a symbol representing the relationship between sizes of two values.

The available power of the battery represents an SOC state of the battery 3 that may drive the driving motor 4 or the starting motor 5, the available torque of the driving motor represents an output that may allow the driving motor 4 to start the engine 7, and the available torque of the starting motor represent an output that may allow the starting motor 5 to start the engine 7. Therefore, numerical values for each of the threshold of the battery, the threshold of the driving motor, and the threshold of the starting motor may vary based on the specifications of the battery 3, the driving motor 4, the starting motor 5, and the engine 7, and therefore may not be limited to one fixed value.

In S40, the quasi-failure mode may be determined by the controller 6 and at the same time, the vehicle may enter the quasi-failure mode by operation of the controller 6. Referring to FIG. 4, the controller 6 may be configured to set the lack of the battery charging by the available power of battery<threshold of battery as a first entry condition, set lack of driving motor output by the available torque of driving motor<threshold of driving motor as a second entry condition, set the failure of the starting motor by the available torque of starting motor<threshold of starting motor as a third entry condition, and satisfaction of any one of the first, second, and third entry conditions as the entry of the quasi-failure mode.

Further, the controller 6 may be configured to set as a performance condition the specific time (e.g., predetermined period of time) when the first entry condition, the second entry condition, or the third entry condition is continued (e.g., a threshold for a predetermined period of time for which the above-described states of the engine cranking apparatus are maintained). Therefore, the controller 6 may be configured to terminate the performance of the quasi-failure mode when any of the first, second, and third entry conditions are not satisfied, while the quasi-failure mode may be performed when any one of the conditions is continued for the specific time in the state in which any one of the first, second, and third entry conditions is satisfied. Particularly, numerical values for maintaining the specific time that is the satisfaction of the performance condition may vary based on the specification of the battery 3, the driving motor 4, the starting motor, and the engine 7, and therefore may not be limited to one fixed value.

In S60, S60-1, S60-2, S70, S80, the quasi-failure mode may be performed. In particular, the controller 6 may be configured to determine the motor for the engine cranking while the vehicle is driven in the EV mode, like S50 and then separately may be configured to try the engine cranking, like S60-1 and S60-2, and as a result perform the failure mode to change the engine to the driving state, like S70 and maintain the engine driving state before the quasi-failure mode is released, like S80. The release of the quasi-failure mode is when the controller 6 determines that the entry condition is not satisfied or the satisfied entry condition is not continued for the specific time. However, the release of the quasi-failure mode changes the driving mode from the EV mode to the HEV mode or also corresponds to when the driving of the vehicle stops.

Referring to FIG. 4, when the method proceeds to S60-1 to try the engine cranking, the output of the controller 6 drives the starting motor 5 to drive the engine 7 in the EV mode. Therefore, the driving of the engine 7 by the starting motor 5 represents that the available torque of driving motor<threshold of driving motor that is the second entry condition is satisfied and the second entry condition is continued for the specific time.

Referring to FIG. 4, when the method proceeds to S60-2 to try the engine cranking, the output of the controller 6 increases the output of the driving motor 4 to transfer the available torque of the driving motor 4 to the engine 7 using the clutch 8, thereby driving the engine 7 during the EV mode. Therefore, the driving of the engine 7 by the driving motor 4 represents that the available torque of starting motor<threshold of starting motor that is the third entry condition is satisfied and the third entry condition is continued for the specific time.

Meanwhile, referring to FIG. 5, it may be appreciated that the hybrid vehicle is implemented as a flywheel mounted electric device (FMED) type hybrid vehicle 1-1. The FMED hybrid vehicle 1-1 may include the battery 3, the driving motor 4, the controller 6 connected with the quasi-failure map 6-1, the engine 7, the clutch 8, and the transmission 9, in which the driving motor 4 may be connected to the engine 7 and may be connected to or separated from the transmission 9 by the clutch 8. Therefore, the FMED hybrid vehicle 1-1 is different in that it does not include the starting motor 5 as compared with the TMED hybrid vehicle 1 of FIGS. 2 to 4, but the quasi-failure mode for the method for guaranteeing starting performance of an engine for maintaining driving performance of FIG. 1 may be implemented.

However, the quasi-failure mode of the FMED hybrid vehicle 1-1 may be implemented in the state in which all the matters corresponding to the starting motor 5 are ruled out from the quasi-failure mode of the TMED hybrid vehicle 1. Therefore, the quasi-failure mode of the FMED hybrid vehicle 1-1 may be performed based on the procedure of S10→S20→S30→S40→S60-2→S70→S80 while omitting S50 and S60-1 in FIG. 1. Here, "→" represents a symbol that indicates a progress direction.

As described above, the method for guaranteeing starting performance of an engine for maintaining driving performance according to the exemplary embodiment of the present invention uses the battery 3, the driving motor 4, and the starting motor 5 as the engine cranking apparatus, uses the battery 3 and the starting motor 5 as the engine cranking apparatus, and uses any one of the MCU, the engine ECU, the BMS, and the HCU as the controller 6 to allow the driving motor 4 or the starting motor 5 to drive the engine 7 in the quasi-failure state in which the engine cranking apparatus is maintained at a threshold or less for the predetermined period of time. As a result, the engine 7 may be driven in the quasi-failure mode while the hybrid vehicles 1 and 1-1 are driven in the EV mode, thereby preventing the vehicle system from being aggravated and fundamentally preventing the degradation in the stability of the vehicle that gives discomfort to the driver.

According to the exemplary embodiments of the present invention, it may be possible to fundamentally prevent the vehicle system from being aggravated due to non-driving of the engine by dividing the engine driving control into the driver starting request, the system starting request, and the quasi-failure mode starting request, compared with the existing two schemes of the driver starting request and the system starting request.

Further, according to the exemplary embodiments of the present invention, it may be possible to guarantee the drivability of the vehicle by the engine driving even when the failure that is not defined in the existing system starting request occurs by performing the quasi-failure mode starting request based on the failure of the engine cranking apparatus for the starting of the engine, in particular, it may be possible to prevent driver discomfort by preventing the situation in which the engine is not driven when the HEV mode driving is required during the EV mode driving. Further, according to the exemplary embodiments of the present invention, it may be possible to avoid the case in which the limp home mode control may not be performed due to the vehicle system that is in the quasi-failure state by using the quasi-failure mode starting request notwithstanding that the vehicle control unit is normal and greatly strengthening the fail-safe strategy of the vehicle by more stably implementing the limp home mode.

The foregoing exemplary embodiments are merely examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A method for guaranteeing starting performance of an engine for maintaining driving performance, comprising:
   monitoring, by a controller, an engine cranking apparatus when a vehicle is being driven by a driving motor;
   determining, by the controller, whether the engine cranking apparatus is maintained to be equal to or less than a threshold for a predetermined period of time;
   driving, by the engine cranking apparatus, an engine when the engine cranking apparatus is maintained to be equal to or less than the threshold for the predetermined period of time; and
   determining, by the controller, that the driving of the engine slops by continuously detecting whether the engine cranking apparatus is maintained to be equal to or less than the threshold for the predetermined period of time,
   wherein the engine cranking apparatus is a combination of a battery, the driving motor, and a starting motor and the monitoring is performed on each of an available power of the battery, an available torque of the driving motor, and an available torque of the starting motor.

2. The method of claim 1, wherein the quasi driving motor is implemented while a vehicle is driven in an electronic vehicle (EV) mode.

3. The method of claim 1, wherein when any one of the available power of the battery, the available torque of the driving motor, and the available torque of the starting motor is equal to or less than the threshold, the controller is configured to determine whether the threshold is maintained for the predetermined period of time.

4. The method of claim 3, wherein when the driving motor is maintained for the predetermined period of time or a specific time, the engine is driven by the starting motor.

5. The method of claim 3, wherein when the starting motor is maintained for the predetermined period of time or a specific time, the engine is driven by the driving motor.

6. The method of claim 1, further comprising:
executing, by the controller, a driver mode to drive the engine in response to a driver request and a system mode to drive the engine in response to a system request detected by the controller.

7. The method of claim 6, wherein the driver request is detected as an accelerator position sensor (AFS) based on an accelerator pedal operation.

8. The method of claim 6, wherein the system request is detected as any one of an air conditioner operation, engine warm-up, and catalyst heating.

9. The method of claim 6, wherein the system request is further detected as an abnormal vehicle state in which the controller detects a failure or an inappropriate state of an input signal.

10. A hybrid vehicle, comprising:
a power source configured to include an engine and a driving motor connected to and separated from the engine by a clutch and connected to a transmission;
an engine cranking apparatus that includes the driving motor, a battery configured to charge and discharge, and a starting motor configured to start the engine and charge the battery; and
a controller configured to perform a method for guaranteeing starting performance of an engine for maintaining driving performance as defined in claim 1.

11. The hybrid vehicle of claim 10, wherein the controller is any one selected from the group consisting of: a motor control unit (MCU), an engine electronic control unit (ECU), a battery management system (BMS), and a hybrid control unit (HCU).

* * * * *